US008892357B2

(12) United States Patent
Feyereisen et al.

(10) Patent No.: US 8,892,357 B2
(45) Date of Patent: Nov. 18, 2014

(54) GROUND NAVIGATIONAL DISPLAY, SYSTEM AND METHOD DISPLAYING BUILDINGS IN THREE-DIMENSIONS

(75) Inventors: Thea L. Feyereisen, Hudson, WI (US); Troy Nichols, Peoria, AZ (US); John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 601 days.

(21) Appl. No.: 12/886,344

(22) Filed: Sep. 20, 2010

(65) Prior Publication Data

US 2012/0072105 A1 Mar. 22, 2012

(51) Int. Cl.
| | |
|---|---|
| G01C 21/00 | (2006.01) |
| G08G 7/02 | (2006.01) |
| G08G 5/06 | (2006.01) |
| G01C 23/00 | (2006.01) |
| G08G 5/00 | (2006.01) |
| G01C 21/36 | (2006.01) |

(52) U.S. Cl.
CPC .............. *G01C 21/00* (2013.01); *G01C 23/00* (2013.01); *G08G 5/0008* (2013.01); *G08G 5/065* (2013.01); *G01C 21/3638* (2013.01); *G08G 5/0021* (2013.01); *G08G 5/0013* (2013.01)
USPC ........... 701/436; 701/439; 701/482; 701/301; 701/120; 340/995.14

(58) Field of Classification Search
CPC .............. G01C 21/00; G01C 21/3635; G01C 21/3638; G08G 5/0047; G08G 5/0065; G08G 5/0017; G08G 5/0021; G08G 5/06; G08G 5/065; G08G 7/00; G08G 7/02; G08G 9/00; G08G 9/02; G06T 19/003
USPC ......... 701/120, 310, 409, 458, 422, 423, 426, 701/431, 433, 436, 438, 439, 482, 532, 701/538; 340/995.1–995.28, 958; 348/113, 348/115, 117, 118; 345/419, 421
See application file for complete search history.

(56) References Cited

U.S. PATENT DOCUMENTS

| | | | |
|---|---|---|---|
| 6,360,168 B1 * | 3/2002 | Shimabara | .................... 701/436 |
| 7,375,678 B2 | 5/2008 | Feyereisen et al. | |
| 2003/0142068 A1 | 7/2003 | DeLuca et al. | |

(Continued)

FOREIGN PATENT DOCUMENTS

JP 2000304558 A * 11/2000 ............. G01C 21/00

OTHER PUBLICATIONS

Drescher, Aubrey, GIS Tips & Tricks, Displaying in 3D with ArcScene, Jan. 18, 2010, http://www.aubreyrhea.net/gis/index.php/page/2/.*

*Primary Examiner* — Khoi Tran
*Assistant Examiner* — Spencer Patton
(74) *Attorney, Agent, or Firm* — Ingrassia Fisher & Lorenz, P.C.

(57) ABSTRACT

A methods, apparatus and system are provided for a vehicle with a ground navigational display. The system may include a display, a navigation system determining a location of the vehicle, a database storing a map including locations of buildings on the map and a processor. The processor may be configured to display the map on the display based upon the location of the vehicle, assign a fixed height to all of the buildings displayed on the display, and render the buildings displayed on the display in three-dimensions and having the assigned fixed height.

17 Claims, 3 Drawing Sheets

(56) References Cited

U.S. PATENT DOCUMENTS

| | | |
|---|---|---|
| 2004/0027344 A1 | 2/2004 | Ohto |
| 2004/0225440 A1* | 11/2004 | Khatwa et al. ............... 701/301 |
| 2005/0104881 A1* | 5/2005 | Yoshida et al. ............... 345/419 |
| 2005/0261826 A1 | 11/2005 | Kurosawa et al. |
| 2008/0180439 A1* | 7/2008 | Adabala et al. ............... 345/421 |
| 2008/0249703 A1* | 10/2008 | Matsuno et al. ............... 701/201 |
| 2008/0319655 A1 | 12/2008 | Vande Velde |
| 2009/0240432 A1 | 9/2009 | Osanai |
| 2010/0118116 A1 | 5/2010 | Tomasz et al. |

\* cited by examiner

GROUND NAVIGATIONAL DISPLAY, SYSTEM AND METHOD DISPLAYING BUILDINGS IN THREE-DIMENSIONS

FIELD OF THE INVENTION

The present invention generally relates to a navigation system and more particularly relates to assisting a pilot of an aircraft during ground operations.

BACKGROUND OF THE INVENTION

Operating a vehicle at night or in adverse weather conditions can be challenging. If the vehicle operator is unfamiliar with the area, the difficulty can be increased. Vehicles may also operate in close proximity to buildings or other fixed objects, other vehicles and pedestrians, which may be difficult to see in certain conditions.

Accordingly, it is desirable to have a system, method and apparatus for assisting the vehicle operator navigate the vehicle in all weather and visibility conditions. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A vehicle with a ground navigational display is provided. The vehicle may include a display, a navigation system determining a location of the vehicle, a database storing a map including locations of buildings on the map and a processor. The processor may be configured to display the map on the display based upon the location of the vehicle, assign a fixed height to all of the buildings displayed on the display, and render the buildings displayed on the display in three-dimensions and having the assigned fixed height.

A method for displaying 3D buildings during group operations of an aircraft is provided. The method may include retrieving a location of the aircraft where the ground operations are occurring, retrieving a map of the location where the ground operations are occurring, including locations of buildings at the location, assigning a fixed height to all of the buildings and displaying, on an aircraft display, the map where all of the buildings are rendered in three dimensions to have the fixed height.

A display system is provided. The display system may include a display, a navigation system determining a location of a vehicle associated with the display system, a database storing a map including locations of buildings on the map and a processor. The processor may be configured to display the map on the display based upon the location of the vehicle, assign a fixed height to all of the buildings displayed on the display, and render the buildings displayed on the display in three-dimensions and having the assigned fixed height.

BRIEF DESCRIPTION OF THE DRAWINGS

The present invention will hereinafter be described in conjunction with the following figures.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
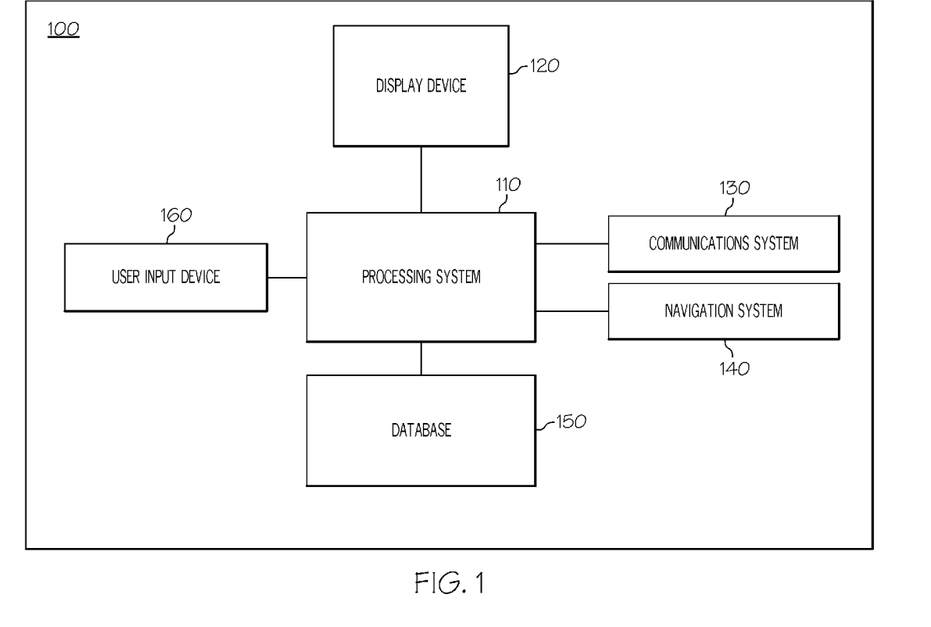
FIG. 1 illustrates an exemplary ground navigation system in accordance with an embodiment.

FIG. 1 illustrates an exemplary ground navigation system 100 for displaying Three-Dimensional ("3D") buildings during ground operations of a vehicle. While this embodiment will be described in reference to an aircraft, other vehicles, for example, cars, tanks, trains, boats, baggage carts and other airport support vehicles may also take advantage of the features of the described embodiment.

The ground navigation system 100 illustrated in FIG. 1 includes a processing system 110 in communication with a display device 120, a communications system 130, a navigation system 140 and a database 150. The ground navigation system 100 may be integrated within the aircraft or may be a portable device which can be taken into the aircraft cockpit.

The processing system 110 generally represents the hardware, software, and/or firmware components configured to facilitate communications and/or interaction between the display device 120 and the other elements of the ground navigation system 100 and perform additional tasks and/or functions to support the ground navigation system 100, as described in greater detail below. Depending on the embodiment, the processing system 110 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 110 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 110 includes processing logic that may be configured to carry out the functions, techniques, and processing tasks associated with the operation of the ground navigation system 100, as described in greater detail below. Furthermore, the steps of a method or algorithm described in connection with the embodiments disclosed herein may be embodied directly in hardware, in firmware, in a software module executed by the processing system 110, or in any practical combination thereof. Although FIG. 1 depicts processing system 110 as a distinct and separate element of the ground navigation system 100, in practice, the processing system 110 may be integrated with another element of the ground navigation system 100.

The display device 120 is realized as an electronic display configured to graphically display flight information or other data associated with operation of the aircraft. The display device 120 for the ground navigation system 100 may be implemented on a primary or secondary display in the aircraft. For example, in one embodiment, display device 120 may be a head-up display ("HUD"), a transparent display that presents data without requiring the user to look away from his or her usual viewpoint. In another embodiment, the display device 120 may be a LCD, plasma, OLED, CRT, projection or other type of video screen present in the cockpit. The display device 120 is coupled to the processing system 110, which are cooperatively configured to display, render, or otherwise convey one or more graphical representations or images associated with operation of the aircraft on the display device 120, as described in greater detail below.

In the illustrated embodiment, the processing system 110 is also coupled to a communications system 130, which is configured to support communications to and/or from the aircraft. The communications system 130 is suitably configured to support communications between the aircraft and air traffic control or another suitable command center or ground location. In this regard, the communications system 130 may be realized using a radio communication system or another suitable data link system.

In an exemplary embodiment, the processing system 110 is also coupled to a navigation system 140, which is configured to provide real-time navigational data and/or information regarding operation of the aircraft. The navigation system 140 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 140, as will be appreciated in the art. The navigation system 140 is capable of obtaining and/or determining the instantaneous position of the aircraft, that is, the current location of the aircraft (e.g., the current latitude and longitude) and the current altitude for the aircraft.

The database 150 is suitably configured to support operations of the processing system 110, and may include, for example, an airport map or layout database, storing map data representative of the map or layout of various airports or flight decks, and building/object data, representative of different buildings or objects associated with the airports or flight decks, or other information for rendering and/or displaying content on the display device 120.

The user input device 160 is coupled to the processing system 110, which are cooperatively configured to allow a user (e.g., a pilot, co-pilot, or crew member) to interact with the display device 120 and/or other elements of the ground navigation system 100 in a conventional manner. Depending on the embodiment, the user input device 160 may be realized as a keypad, touchpad, keyboard, mouse, touch panel (or touch screen), joystick, knob, line select key or another suitable device adapted to receive input from a user. In some embodiments, the user input device 160 is realized as an audio input device, such as a microphone, audio transducer, audio sensor, or the like, that is adapted to allow a user to provide audio input to the ground navigation system 100 in a "hands free" manner without requiring the user to move his or her hands and/or head to interact with the display device 120.

In operation, the processing system 110 may retrieve, from the navigation system 140, a location of the aircraft. Alternately, a user may enter the location on the user input device 160. In another embodiment, the processing system may receive the location from communication system 130. The communication system 130 may receive a transmission containing the location of the aircraft from, for example, the airport tower or any other communication system.

The processing system 110 may then access database 150 and retrieve map data representative of a map or layout of the airport, flight deck or other area based upon the location of the aircraft. Alternatively, the processing system 110 may receive map data representative of the map or layout from the communication system 130. The communication system 130 may receive a transmission containing the map data representative of the map or layout, for example, from the airport tower or any other communication system. The map data may include, for example, the location of runways, taxiways, terminal buildings, hangers, the airport tower and any other pathways, buildings or obstacles in an airport setting. In other embodiments, where the vehicle may not be related to airports, other data may be stored in the database appropriate for the environment in which the vehicle navigates.

In one embodiment, the retrieved map data may include only two-dimensional information; thereby reducing the amount of data storage required to store or transmit the data as compared to map data which includes 3-D information. The processing system 110 may then assign each building or object a fixed height. The fixed height should be large enough to make the building or object pop out of the map, allowing the pilot to visually appreciate the building or object, while being short enough to see objects, or other buildings, rendered on the display device 120 behind the building or object. In one embodiment, each building may be assigned a different color and/or texture depending upon the type of building. For example, terminal buildings may be a different color than hangers. In another embodiment, the buildings and objects may also be assigned different heights. For example, an airport tower may be assigned a larger height to give pilots a point of reference on the map. Any combination of heights, colors, textures and various other visual characteristics may be used to distinguish the buildings. The buildings may also be assigned a transparency, to assist pilots to see objects or buildings which may be behind other buildings.

Alternatively, the map may already contain 3-D data. For example, the map may contain the actual height of each building in the airport or may already include assignation data, assigning each building a fixed height. If the map contains the actual height data for each building, the processing system 110 may reduce each building to the predetermined fixed height and/or modify the height of the buildings in accordance with any of the other methods discussed herein.

In one embodiment, the processing system 110 may also receive movable object information from the communications system 130. The movable object information may include the location of some or all of the objects moving on the ground at the aircrafts location. The communication system may receive object location signals directly from each object, or may receive all of the object location signals from a single source, such as an airport communications system, or some combination thereof. The communications system may also receive other information about the movable objects, such as a type (i.e., aircraft, baggage cart, food-service cart, gas cart, other vehicle, ground personnel, etc). Accordingly, the processing system 110 may identify the type of object moving to the pilot, for example, by generating an image of the object, or by describing the object. Alternatively, each object could be assigned a different color, texture, transparency, height or any combination thereof, according to its respective object type.

In another embodiment, the height of each building may be assigned a dynamic height by the processing system 110, depending upon what object is behind the buildings. For example, if a Boeing 747 is taxiing behind a terminal, the height of the terminal may not be affected, assuming the Boeing 747 could be seen above a default assigned fixed height of the terminal. In contrast, if a smaller plane, such as Cessna, were to taxi behind the same terminal, the height of the terminal may be temporarily reduced so the pilot could see the smaller plane. In one embodiment, the height of the building may be adjusted, dynamically, when the object behind the building has a height that is less than or equal to the default fixed height assigned to the building. In another embodiment, the height of the object may be adjusted dynamically when the object behind the building has a height that is less than or equal to the default fixed height assigned to the building. In another embodiment, every displayed object may be assigned a fixed height that is larger than the fixed height of the buildings.

In another embodiment, other attributes of the building may be assigned dynamically, depending upon what object is behind the buildings. For example, the processing system 110 may assign a different color and/or texture to the building when smaller objects are moving behind the building, such as a small plane, baggage carts or ground personal, which can not be seen above the fixed height of the building. In another embodiment, the processing system 110 may dynamically change the transparency of the buildings when smaller objects are behind the buildings.

The processing system 110 may then cause a map, with the buildings rendered in 3D with the respective fixed or dynamic height, to be displayed on display device 120. The processing system 110 may update the map in real time to reflect movement by the aircraft and/or movement by other movable objects displayed on the display device 120.

The display may be configured to have a perspective view, where a graphical representation of the aircraft is displayed on the map. This configuration would allow the pilot to easily visualize where the aircraft, including the wings and rear portion of the aircraft, are in relation to the various buildings, pathways and objects. In another embodiment, the display may be configured to have a "first-person" view. For example, the display may be configured to correspond to view from a cockpit window, such that the generated map corresponds to what the pilot is seeing from the cockpit window.

In one embodiment, the pilot may be able to switch between the perspective view and first person view using the user input device 160. The pilot may also be able use the user input device 160 to zoom in and out in either view and to pan across the map. The pilot may also be able to adjust the height, relative to the ground or aircraft, of the perspective view.

In another embodiment, the pilot may be able to alter display options in real time using the user input device 160. For example, the pilot may wish to distinguish between terminal buildings and other buildings by changing the color or texture of the terminals to make them stand out from other buildings.

One benefit of the claimed embodiments, for example, is that the pilot can instantly differentiate taxiways from other objects, such as buildings, since the buildings are rendered in three dimensions. In contrast, if the building is flat, that is, merely a footprint of the building is shown, additional cognitive workload demands are placed upon the pilot in disambiguating between taxi areas and buildings. If the pilot is navigating the plane at night and/or in adverse weather conditions, the map displayed by the display device 120 can assist the pilot in detecting obstacles (buildings, other vehicles, personnel, etc) that the pilot may have difficulty seeing through the cockpit window, thereby giving the pilot confidence to navigate the aircraft through the airport. The map displayed on the display device 120 may also give the pilot a reference for the layout of the airport.

Another benefit of the claimed embodiments is that since the buildings on the map are displayed at a fixed height, the amount of data needed to store the maps is dramatically reduced. Further, maps that contain actual 3D information can cost three times the amount to generate relative to two-dimensional maps. Accordingly, the claimed embodiments provide a method of presenting three-dimensional maps to the user without the high costs associated with storing and creating three-dimensional data.

Figure 2:
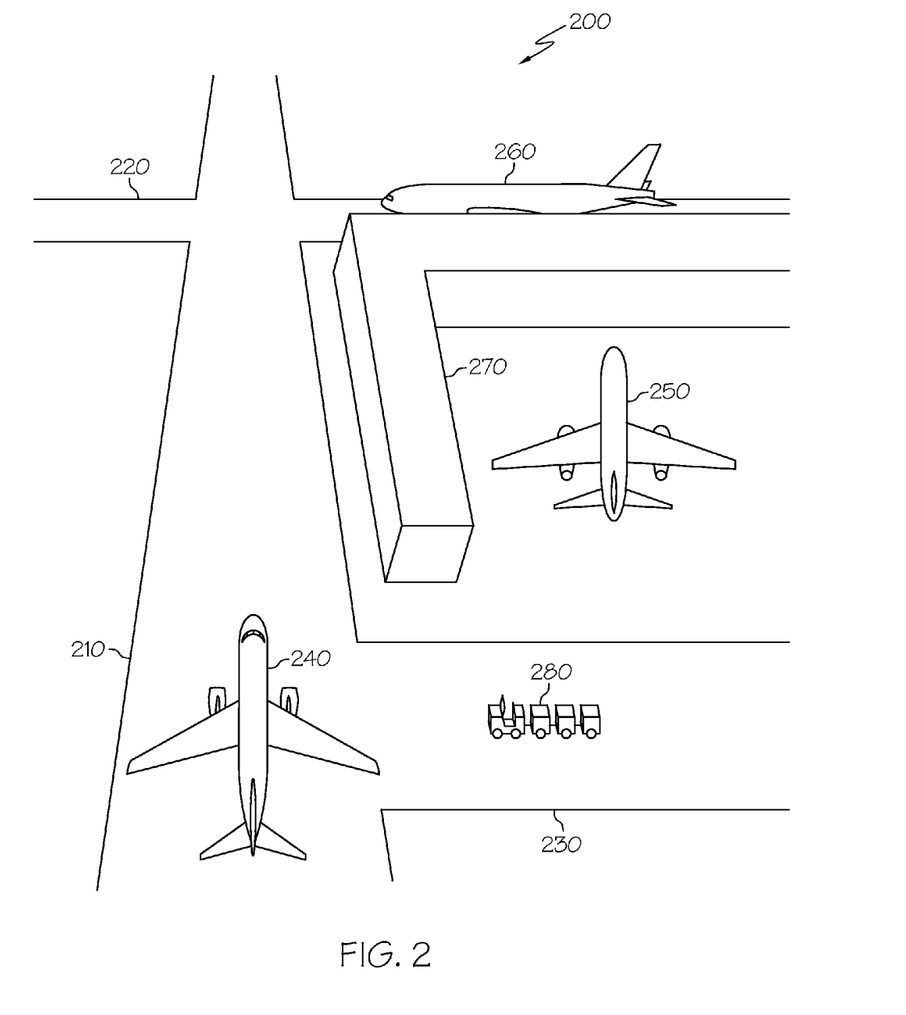
FIG. 2 illustrates an exemplary display in accordance with an embodiment.

FIG. 2 illustrates an exemplary map 200 displayed on an aircraft display for aircraft 240. The map 200 includes intersecting taxiways 210, 220 and 230. As seen in the exemplary map 200, the aircraft 240 is on taxiway 210. The aircraft 240 is also receiving signals from two other nearby aircraft, aircraft 250 and 260, which are also displayed on map 200. As discussed above, the map 200 may also display other types of vehicles or personnel, such as baggage cart 280 which is being driven along taxiway 230, so that the pilot of aircraft 240 is aware of other traffic at the airport.

The map 200 further displays a 3D representation of building 270. Because the building 270 is represented in three dimensions and the taxiways 210-230 are represented in two dimensions (i.e., the taxiways are flat relative to the ground), the building 270 pops out and is instantly recognizable as an object the pilot of aircraft 240 wants to avoid collision with. Furthermore, as seen in map 200, the building 270 is set to a fixed height so that taxiing aircraft, such as aircraft 260, can be seen behind the building 270. As discussed above, the height of building 270 may change depending upon the objects behind the building. The object behind the building, whether vehicle or personnel, which is shortest in height would be the object used to determine the height of the building 270.

Figure 3:
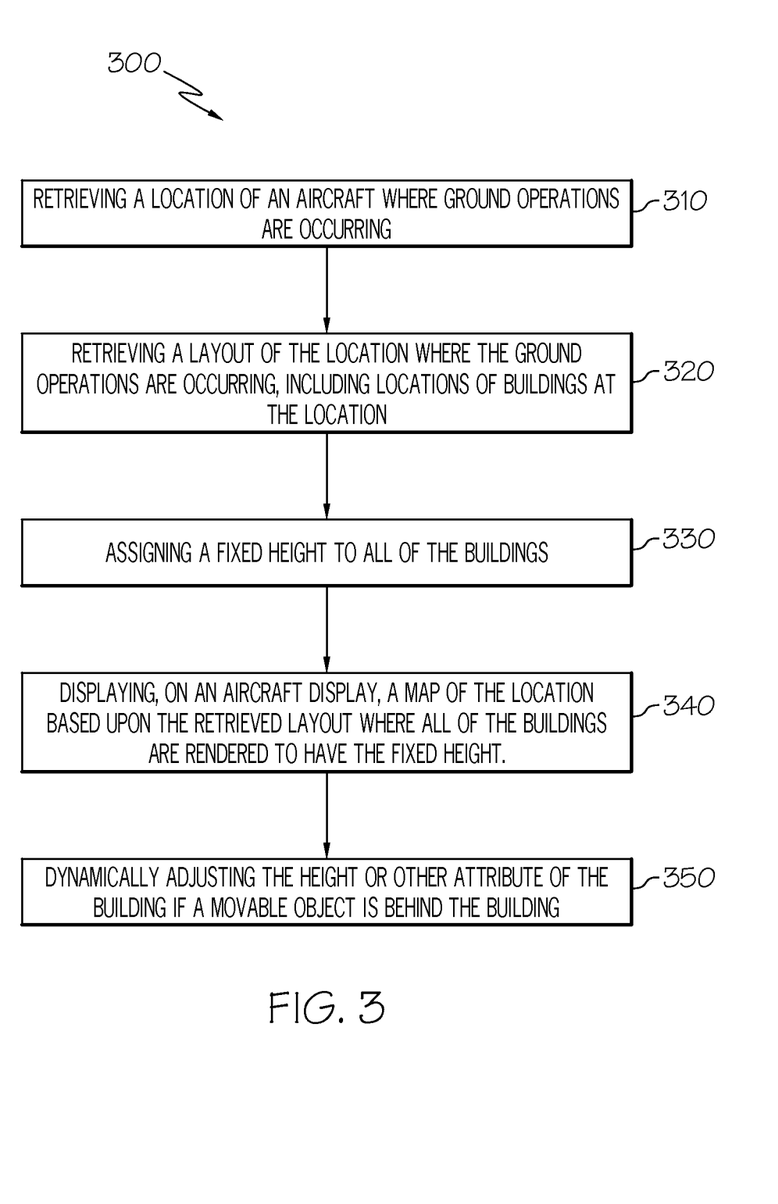
FIG. 3 illustrates an exemplary method in accordance with an embodiment.

FIG. 3 illustrates a flow diagram of an exemplary method or system process 300 for generating the map with buildings rendered in three-dimensions in accordance with one embodiment. In a first step 310, the system may retrieve a location of an aircraft where ground operations are occurring. The system then, in step 320, may then retrieve a layout or map of the location where the ground operations are occurring, including locations of buildings at the location. The system may then, in step 330, assign a fixed height to all of the buildings. Thereafter, the system, in step 340, displays, on an aircraft display, a map of the location based upon the retrieved layout where all of the buildings are rendered to have the fixed height. In one embodiment, the system may, in step 350, dynamically adjust the height or other attribute of the building if a movable object is behind the building, in accordance with any of the methods discussed herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle, comprising:
   a display;
   a navigation system configured to determine a location of the vehicle;
   a database storing map data, the map data including locations of buildings;
   a communication system receiving a location of at least one movable object; and a processor configured to:
  selectively retrieve map data based upon the location of the vehicle,
  display the retrieved map data on the display,
  render buildings associated with the retrieved map data in three-dimensions on the display,
  display the at least one movable object on the displayed map data,
  determine, when the at least one movable object is located behind at least one rendered building, if a height of the at least one movable objet is less than or equal to the height of the at least one rendered building, and
  dynamically adjust a height of the at least one rendered building when the at least one movable object is located behind the at least one rendered building and the height of the at least one movable object is determined to be less than or equal to the height of the rendered building.

2. The vehicle of claim 1, wherein the processor is further configured to dynamically adjust a transparency of at least one building if the at least one movable object is located behind the at least one building and a height of the at least one movable object is less than or equal to the height of the rendered building.

3. The vehicle of claim 1, wherein the processor is further configured to assign a fixed height to the at least one movable object, wherein the fixed height of the at least one movable object is larger than the height of the rendered building.

4. The vehicle of claim 1, wherein the database stores a building type associated with at least one building, and
  the processor is further configured to adjust at least one of a color, texture or assigned height of the at least one building based upon the associated building type.

5. The vehicle of claim 4, further comprising:
  a user input device,
  wherein the processor is further configured to, in response to input by a user of the user input device, adjust at least one of the color, texture or assigned height of the at least one building based upon the associated building type.

6. The vehicle of claim 1, where all of the rendered buildings are initially rendered at the same height.

7. A method for displaying 3D buildings during ground operations of an aircraft, comprising:
  determining a location of the aircraft where the ground operations are occurring;
  retrieving map data representative of the determined location, the map data including locations of buildings at the determined location;
  displaying, on an aircraft display, the map data with all of the buildings rendered in three dimensions;
  receiving a location of movable objects at the location of the aircraft;
  displaying, on the map displayed on the aircraft display, a representation of the received movable objects;
  receiving a height of the movable objects at the location of the aircraft;
  determining, when at least one movable object is located behind at least one rendered building, if a height of the at least one movable objet is less than or equal to the height of the at least one rendered building; and
  dynamically adjusting the height of the at least one of the rendered building when the at least one movable object is located behind the at least one rendered building and the height of the at least one movable object located behind the at least one rendered building is determined to be less than or equal to the height of the one rendered building.

8. The method of claim 7, further comprising:
  retrieving a building type associated with at least one of the buildings; and
  adjusting at least one of a color, texture or height of the at least one building with an associated building type.

9. The method of claim 7, further comprising:
  dynamically adjusting the at least one of color, texture or height of a rendered building when a movable object is located behind the rendered building and the height of the movable object located behind the rendered building is less than or equal to the height of the rendered building.

10. The method of claim 7, further comprising:
  assigning a fixed height to the movable objects, where the fixed height of the movable objects is greater than the fixed height of the rendered buildings.

11. The method of claim 7, further comprising:
  assigning an equal height to all of the buildings; and
  displaying, on an aircraft display, the map data with all of the buildings rendered in three dimensions at the assigned height.

12. A display system, comprising:
  a display;
  a navigation system configured to determine a location of a vehicle associated with the display system;
  a database storing map data, the map data including locations of buildings;
  a communication system receiving a location of at least one movable object; and
  a processor configure to:
    selectively retrieve map data based upon the determined location,
    display the retrieved map data on the display,
    display the at least one movable object on the displayed map data,
    render buildings associated with the retrieved map data in three-dimensions on the display,
    determine, when the at least one movable object is located behind at least one rendered building, if a height of the at least one movable objet is less than or equal to the height of the at least one rendered building, and
    dynamically adjust a height of the at least one building when the at least one movable object is located behind the at least one building and the height of the at least one movable object is determined to be less than or equal to the height of the rendered building.

13. The display system of claim 12, wherein the processor is further configured to dynamically adjust a transparency of at least one building if the at least one movable object is located behind the at least one building and a height of the at least one movable object is less than or equal to the height of the rendered building.

14. The display system of claim 12, wherein the processor is further configured to assign a fixed height to the at least one movable object, wherein the fixed height of the at least one movable object is larger than the height of the rendered buildings.

15. The display system of claim 12, wherein the database stores a building type associated with at least one building, and
  the processor is further configured to adjust at least one of a color, texture or assigned height of the at least one building based upon the associated building type.

16. The display system of claim 15, further comprising:
a user input device,
wherein the processor is further configured to, in response to input by a user of the user input device, adjust the at least one of color, texture or assigned height of the at least one building based upon the associated building type.

17. The display system of claim 12, where all of the rendered buildings are initially rendered at the same height.

* * * * *

UNITED STATES PATENT AND TRADEMARK OFFICE
CERTIFICATE OF CORRECTION

PATENT NO. : 8,892,357 B2  
APPLICATION NO. : 12/886344  
DATED : November 18, 2014  
INVENTOR(S) : Feyereisen et al.

Page 1 of 1

It is certified that error appears in the above-identified patent and that said Letters Patent is hereby corrected as shown below:

In the Claims  
Column 7, line 11, "objet" should be changed to --object--;  
Column 7, line 60, "objet" should be changed to --object--; and  
Column 8, line 41, "objet" should be changed to --object--.

Signed and Sealed this  
Fifteenth Day of December, 2015

Michelle K. Lee  
*Director of the United States Patent and Trademark Office*